(12) United States Patent
Shan et al.

(10) Patent No.: US 9,657,147 B2
(45) Date of Patent: May 23, 2017

(54) METHOD FOR PREPARING GLYCOLIDE POLYESTER BY RING OPENING POLYMERIZATION

(75) Inventors: Jun Shan, Helsinki (FI); Mika Härkönen, Rajamäki (FI); Jarmo Ropponen, VTT (FI); Ali Harlin, VTT (FI); Harri Heikkinen, VTT (FI); Virpi Rämö, VTT (FI); Thomas Gädda, VTT (FI); Leena Nurmi, Rajamäki (FI); Pia Willberg-Keyriläinen, VTT (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 268 days.

(21) Appl. No.: 14/123,065

(22) PCT Filed: May 23, 2012

(86) PCT No.: PCT/FI2012/050492
§ 371 (c)(1),
(2), (4) Date: Feb. 12, 2014

(87) PCT Pub. No.: WO2012/160258
PCT Pub. Date: Nov. 29, 2012

(65) Prior Publication Data
US 2014/0309366 A1 Oct. 16, 2014

(30) Foreign Application Priority Data

May 23, 2011 (FI) .................................... 20115504

(51) Int. Cl.
| | | |
|---|---|---|
| *C08G 63/82* | (2006.01) | |
| *C08J 3/20* | (2006.01) | |
| *C08G 63/06* | (2006.01) | |
| *C08G 63/81* | (2006.01) | |
| *C08G 63/87* | (2006.01) | |

(52) U.S. Cl.
CPC .............. *C08J 3/203* (2013.01); *C08G 63/06* (2013.01); *C08G 63/81* (2013.01); *C08G 63/823* (2013.01); *C08G 63/87* (2013.01); *C08G 63/82* (2013.01); *Y10T 428/2982* (2015.01)

(58) Field of Classification Search
CPC ............................... C08G 63/82; C08G 63/823
See application file for complete search history.

(56) References Cited

U.S. PATENT DOCUMENTS

| | | | |
|---|---|---|---|
| 3,846,382 A | 11/1974 | Ramsey et al. | |
| 6,646,103 B1 | 11/2003 | Le Perchec et al. | |
| 2004/0072985 A1 | 4/2004 | Lee et al. | |
| 2007/0244293 A1* | 10/2007 | Sato ........................ | C08G 63/90 |
| | | | 528/272 |
| 2009/0306333 A1 | 12/2009 | Jing et al. | |
| 2012/0046437 A1* | 2/2012 | Coady .................. | C08G 63/823 |
| | | | 528/336 |
| 2012/0101233 A1* | 4/2012 | Carpentier ................ | C07F 3/02 |
| | | | 525/242 |

FOREIGN PATENT DOCUMENTS

| | | |
|---|---|---|
| EP | 1 970 399 A1 | 9/2008 |
| JP | 2000-128963 A | 5/2000 |
| JP | 2008-163073 A | 7/2008 |
| WO | WO 2010/100390 A1 | 9/2010 |

OTHER PUBLICATIONS

Dove, A. P., "Controlled ring-opening polymerisation of cyclic esters: polymer blocks in self-assembled nanostructures," Chem. Commun. (2008), pp. 6446-6470.
International Search Report issued Aug. 10, 2012, in PCT International Application No. PCT/FI2012/050492.
Le Ray et al., "Fate of [14C]poly(DL-lactide-co-glycolide) nanoparticles after intravenous and oral administration to mice," International Journal of Pharmaceuticals (1994), vol. 106, pp. 201-211.
Lohmeijer et al., "Guanidine and Amidine Organocatalysts for Ring-Opening Polymerization of Cyclic Esters," Macromolecules (2006), vol. 39, pp. 8574-8583.
Search Report issued Feb. 14, 2012, in Finnish Patent Application No. 20115504.
Shalaby et al., "Development of novel substrates for tumor immunotherapy," Journal of Controlled Release (2003), vol. 91, pp. 209-224.
Shibasaki et al., "Activated Monomer Cationic Polymerization of Lactones and the Application to Well-Defined Block Copolymer Synthesis with Seven-Membered Cyclic Carbonate," Macromolecules (2000), vol. 33, pp. 4316-4320.
Sosnowski et al., "Synthesis of bioerodible poly([epsilon]-caprolactone) latexes and poly(D,L-lactide) microspheres by ring-opening polymerization," Database Compendex [Online] Engineering Information, Inc., New York, NY, XP002681095, Database Accession No. EIX95142565245, Abstract, Jul. 31, 2012.
Zhang et al., "Phosphazene Bases: A New Category of Organocatalysts for the Living Ring-Opening Polymerization of Cyclic Esters," Macromolecules (2007), vol. 40, pp. 4154-4158.

* cited by examiner

Primary Examiner — Michael Pepitone
(74) Attorney, Agent, or Firm — Berggren, Inc.

(57) ABSTRACT

The present invention relates to a method for preparation a glycolide polyester by ring opening polymerization characterized in that glycolide monomer with optional co-monomer(s) of cyclic ester(s) is/are subjected to ring opening polymerization in the presence of a dispersion stabilizer and a catalyst, said catalyst being selected for precipitating glycolide homopolymer or copolymer from solvent, said solvent being selected so that the glycolide monomer and the optional co-monomer(s), the dispersion stabilizer and the catalyst are soluble therein but said glycolide homopolymer or copolymer is non-soluble. The present invention further relates to an in situ ring opening polymerizing process product, and to use of said glycolide polyester, and to further processing of said glycolide polyester.

34 Claims, 1 Drawing Sheet

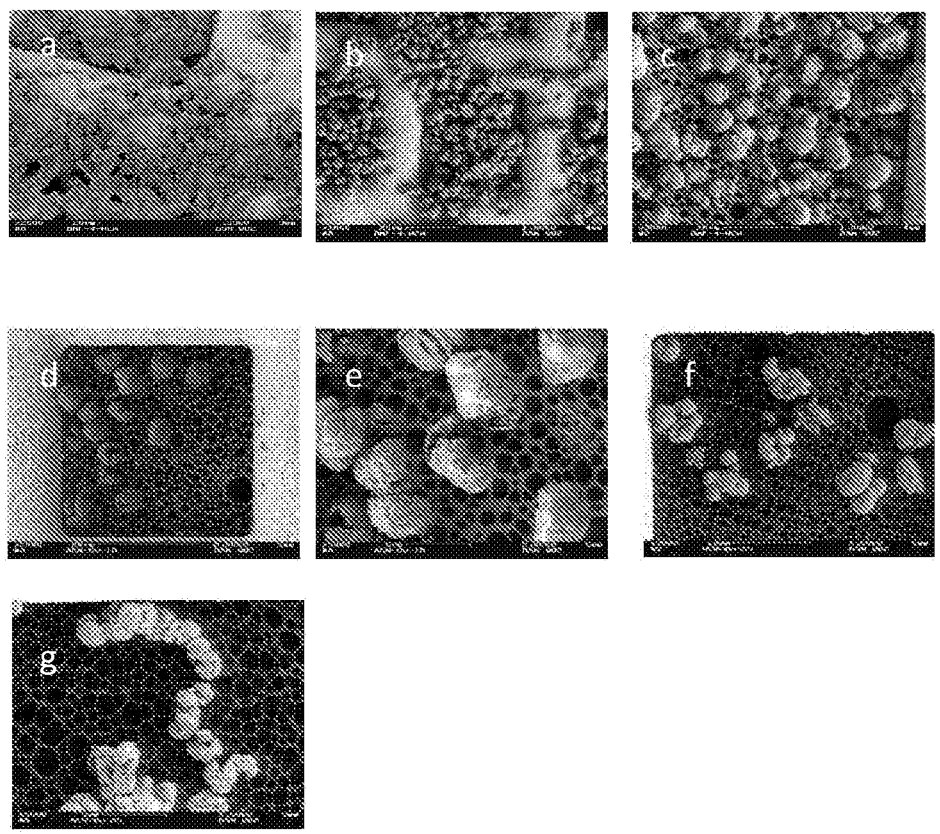

METHOD FOR PREPARING GLYCOLIDE POLYESTER BY RING OPENING POLYMERIZATION

CROSS REFERENCE TO RELATED APPLICATIONS

This application is a US national application of PCT/FI2012/050492 filed on May 23, 2012 which claims priority of Finnish patent application FI20115504 filed on May 23, 2011.

FIELD OF THE INVENTION

The present invention relates to a method for preparing glycolide homo- and copolymers using ring opening polymerization. The present invention further relates to an in situ ring opening polymerizing process product. Furthermore, the present invention relates to a use of said glycolide homopolymer or copolymer product, and to a method for further processing said glycolide homopolymer or co-polymer.

BACKGROUND ART

Aliphatic, biodegradable polyesters are usually synthesized by ring opening polymerization in the presence of metal catalysts. The most commonly used catalyst is tin(II) ethylhexanoate ($Sn(oct)_2$), while the polymerizing process has been carried out by using melt polymerizing techniques at high temperatures above the melting temperature of the produced polyester. It brings certain disadvantages such as high energy demanding process, difficult-handling in application, coloured products due to oxidation and metal catalyst residue containing products which limits applications. In particular, it is difficult for polyglycolide to be prepared in this way because of its relatively high melting temperature.

Publication Gautier, E. et al, Synthesis and Rheology of Biodegradable Poly(glycolic acid) Prepared by Melt Ring-Opening Polymerization of Glycolide, J. Polym. Sci.: Part A: Polym. Chem., 2009, 47, 1440-1449 discloses ring opening polymerization of glycolide in melt.

Alternatively these polyesters can be prepared by solution ring opening polymerisation, but this method is not preferred for high volume industrial processes mainly due to costly and technically demanding product recovery from the polymer solute.

Publication Dechy-Cabaret, O. et al, Controlled Ring-Opening Polymerization of Lactide and Glycolide. Chem. Rev. 2004, 104, 6147-6176 discloses ring opening polymerization of lactide and glycolide in controlled manner.

Polyglycolide, or poly(glycolic acid), can also be produced by dehydration condensation polymerization with similar difficulties as described above for the ring opening polymerization of glycolide in molten state. In addition, high molecular weight is difficult to reach by condensation polymerisation.

Generally, glycolide ring opening polymerization can be achieved by cationic, metal catalyzed coordination-insertion and anionic/nucleophilic mechanisms. Only a few catalysts exists which can effectively catalyze glycolide ring opening polymerization by cationic mechanisms to high conversion and narrow molecular weight distribution. As noted, the properties and the number of applications may be further limited by metals left in the polymer when a coordination-insertion mechanism is used.

Earlier polymerization methods for preparation of polyesters and their copolymers performed by a ring opening polymerization has also lead to difficulties in collection of said polymers from reactor. In addition, making polyesters or co-polymers thereof by a melt process method has typically required pelletization of produced polyester-product before using as a plastic. And as said above, an important drawback in using melt polymerizing techniques for preparing polyesters relates to the needed high process temperature, which set tight requirements for equipments and is very energy-intensive process.

Publication Kamber, N. E. et al, Organocatalytic Ring-Opening Polymerization. Chem. Rev. 2007, 107, 5813-5840 discloses ring opening polymerization with organocatalysts.

Publication Kiesewetter, M. K. et al, Organocatalysis: Opportunities and Challenges for Polymer Synthesis. Macromolecules 2010, 43, 2093-2107 discloses organocatalysts in polymer synthesis.

Based on above, there is still a need for a more efficient, that is, low-temperature and fast method for preparing glycolide polyester by ring opening polymerization. Moreover, there is need for a method for preparing glycolide polyester by ring opening polymerization in which resulting glycolide polyester is easily collected and can be easily processed further.

SUMMARY OF THE PRESENT INVENTION

The present invention relates to a method according to preamble of claim 1 for preparing glycolide homo- and co-polymers using a ring opening polymerization.

The present invention further relates to an in situ ring opening polymerizing process product according to preamble of claim 23.

The present invention further relates to use of said glycolide homopolymer or copolymer product according to preamble of claim 25.

The present invention further relates a method for further processing said glycolide homopolymer or copolymer according to preamble of claim 26.

It has now been surprisingly found that by the method of the present invention glycolide polyester may be produced by ring opening polymerization rapidly in low temperatures. Furthermore, it was surprisingly found that the glycolide polyester precipitates from the solvent when using the method of the present invention. The precipitated glycolide polyester is easily separated, for example by filtration, and is ready to be used further. Furthermore, it was surprisingly found that average particle size of resulting glycolide polyester can be affected.

With the method of the present invention, it is achieved a method to directly utilize the resulting glycolide homo- and/or co-polymers in further applications. The method and the resulting glycolide homo- and/or co-polymers have several benefits including easy-handling, metal-free polymer, colourless product, reduced energy consumption, and convenient scale-up in industry.

In the above mentioned method the conversion of glycolide monomer and optional cyclic ester co-monomer(s) to glycolide homopolymer and/or copolymers is very effective. The reaction can be carried out at low temperature and high yields are obtained within the time period of some hours.

FIGURES

FIG. 1 shows SEM images ((a)-(g)) of synthesized glycolide polymers.

DETAILED DESCRIPTION OF THE INVENTION

In the first aspect, the present invention provides a method for preparing glycolide homo- and co-polymers using ring opening polymerization.

In the second aspect, the present invention provides an in situ ring opening polymerizing process product.

In the third aspect, the present invention provides a use of said glycolide homopolymer or co-polymer product.

In the fourth aspect, the present invention provides a method for further processing said glycolide homopolymer or co-polymer.

The ring opening polymerization for preparing glycolide homopolymer and glycolide co-polymer polyesters is based on a) use of a more effective, and preferably metal-free catalyst at room temperature, and b) selecting solvent or solvent combination so that the glycolide monomer and/or optional comonomer(s), a dispersion stabilizer and said catalyst are soluble therein, but the resulting glycolide homopolymer and/or glycolide co-polymer is non-soluble.

In the method of the present invention glycolide polyester is prepared by ring opening polymerization in which the glycolide monomer with optional comonomer(s) of cyclic ester(s) is/are subjected to ring opening polymerization in the presence of a dispersion stabilizer and a catalyst selected for precipitating glycolide homopolymer or co-polymer from solvent. Said solvent is selected so that the glycolide monomer and optional co-monomer(s), said dispersion stabilizer and said catalyst are soluble therein, but the resulting glycolide homopolymer or glycolide co-polymer is non-soluble. That is, as the result of the polymerization, glycolide homopolymer or glycolide co-polymer particles are formed.

By glycolide polyester is meant glycolide homopolymer and/or glycolide copolymer.

Solvent means herein a single solvent or combination of several solvents. A solvent which is used in the ring opening polymerization according to the present invention should meet criteria: i) the solvent should be good enough to dissolve all starting materials, that is, monomer (glycolide), optional comonomer, optional initiator, catalyst and dispersion stabilizer, and ii) it should not dissolve resulting polymer (homopolyglycolide and co-polymers).

In a preferred embodiment the solvent is an organic solvent or a combination of organic solvents. Preferably the solvent is inert under the ring opening polymerization conditions, that is, it does not react either with the glycolide monomer or optional co-monomer(s) of cyclic ester(s) in the polymerization conditions. Preferably the solvent does not initiate or terminate said ring opening polymerization process according to invention. This means that the solvent or solvent combination should not contain functional hydroxyl groups.

The solvent is selected so that the glycolide monomer and the optional comonomer(s), the dispersion stabilizer and the catalyst are soluble therein but resulting glycolide homopolymer or co-polymer is non-soluble. The solvent is further chosen so that the difference in solubility parameters of said solvent and monomers are as small as possible which will permit high solid contents in the polymerization mixture.

The organic solvent is selected from a group comprising alkanes, halogenated alkanes, aromatics, ethers such as tetrahydrofuran (THF), ketones, esters and amines. The organic solvents are used alone or in any combination suitable for the synthesis. Examples of the organic solvents are pentane, hexane, heptane, dichloromethane ($CH_2Cl_2$), trichloromethane, tetrachloromethane, dichloroethane, tetrachloroethane, benzene, toluene, ethyl benzene, chlorobenzene, dichlorobenzene, aniline, pyridine, tetrahydrofuran, diethyl ether, 1,4-dioxane, diphenyl ether, diamyl ether, ethylene glycol dimethyl ether, di(ethylene glycol)dimethyl ether, tri(ethylene glycol)dimethyl ether, ethylene glycol diethyl ether, propylene glycol dimethyl ether, di(propylene glycol)dimethyl ether, propylene glycol dimethyl ether, acetone, methyl ethyl ketone, diethyl ketone, methyl isobutyl ketone, methyl amyl ketone, ethyl amyl ketone, methyl acetate, ethyl acetate, propyl acetate, butyl acetate, amyl acetate, dimethyl phthalate, diethyl phthalate, triethylamine, tripropylamine, tributylamine, trihexylamine, trioctylamine, dimethyl sulfoxide (DMSO), carbon sulfide, acetonitrile (ACN), N,N-dimethylformamide (DMF), and N,N-dimethylacetamide. Preferably the organic solvent is acetone, acetonitrile, dimethyl sulfoxide, N,N-dimethylformamide, tetrahydrofuran, and mixtures thereof.

The solvent should be good enough to dissolve all starting materials, that is, the monomer (glycolide), the optional co-monomer(s), an optional initiator, the catalyst and the dispersion stabilizer The optional co-monomer of cyclic ester means herein both cyclic monoesters and cyclic diesters. An example of a cyclic monoester is ε-caprolactone, whereas an example of a cyclic diester is lactide.

In a preferred embodiment of the present invention the optional co-monomer of cyclic ester is selected from the group comprising lactides, lactones and mixtures thereof, and is preferably lactide, ε-caprolactone, pivalolactone, α-propiolactone, β-propiolactone, β-butyrolactone, γ-butyrolactone, δ-valerolactone, γ-valerolactone, or mixtures thereof.

The catalyst used in the ring opening polymerization of the present invention is a super base catalyst or a cationic catalyst.

The cationic catalyst is selected from the group comprising acids with diethylether complex of hydrogen chloride (HCl.$Et_2O$), fluorosulfonic acid, trifluoromethanesulfonic acid, methyl trifluorosulfonate, ethyl trifluoromethanesulfonate n-propyl trifluorosulfonate, and i-propyl trifluorosulfonate. The cationic catalyst may also be selected from a group of compounds that are formed by combining a strong Lewis acid and a strong Brønsted acid. A specific example of such a compound is a equimolar combination of fluorosulfonic acid and antimony pentafluoride.

The super base catalyst means herein an organic catalyst selected from the group comprising amidines, guanidines, multicyclic polyamines, phosphazene derivatives and organometallic compounds.

The super base catalyst is preferably a metal-free organic catalyst and selected preferably from the group comprising amidines, guanidines, multicyclic polyamines and phosphazene derivatives. The phosphazene derivative is preferably phosphine imide.

Both the cationic catalyst and the super base catalyst are able to activate the cyclic ester or diester to ring opening polymerization in the presence of an initiator. However, the catalyst may also be able to initiate the polymerization. Commonly employed compounds which can act as an initiator for the ring opening polymerization possess one or more hydroxyl- or thiol functional group(s). The use of multifunctional compounds as an initiator permits the formation of brush-like or star-shaped polymers which may have unique properties when compared to their linear analogs. Similarly, macromolecules such as mono-, di- and polysaccharides as well as hydroxyl- or thiol functional polymers can be used as macroinitiators for the ring opening polymerization. Water may also act as an initiator for the ring-opening polymerization of cyclic esters during use of above catalysts.

Super bases herein are referred as compounds which exhibit basicity significantly higher than that of commonly used amines such as pyridine or triethylamine. Super bases can broadly be divided into three categories: organic, organometallic and inorganic.

Organic super bases comprise molecules characterized as amidines, guanidines, multicyclic polyamines and phosphazenes. Organometallic super bases consist of metal alkyls, metal alkoxides and metal amides such as butyl lithium, potassium t-butoxide, lithium diisopropylamide and lithium bis(trimethylsilyl)amide to give an example of these. Mixtures of organometallic super bases can also be used to further enhance their reactivity; a mixture of butyl lithium and potassium t-butoxide an example of such. Inorganic super bases are frequently compounds with anions that are small in size and exhibit a high charge density such as metal hydrides in general and lithium nitride to give as examples.

When employed, the super bases may initiate and at least catalyze the ring opening polymerization of cyclic esters by a mechanism that is classified as anionic or nucleophilic. In an anionic mechanism, the initiation occurs by either A) a deprotonated initiator or by nucleophilic attack on the carbonyl by the super base catalyst, or B) deprotonation of the α-carbon.

The nucleophilic mechanism is closely similar to the anionic mechanism. Herein, an organic super base activates the cyclic ester monomer toward nucleophilic attack by the initiator, which may be deprotonated by the organic super base. Such polymerizations are of particular interest as they are free of metal catalysts which frequently render polymers unsuitable for many applications or impair the performance of the final polymer.

Amidines are classified as amine compounds which have an imine function adjacent to the α-carbon (schema below). Structurally these correspond to amine equivalents of carboxylic esters. The alkyl substituents $R^1$-$R^4$ may consist of hydrogen and/or C1-C16 alkyl substituents that may be linear, branched, cyclic or aromatic. Further these alkyl substituents $R^1$-$R^4$ may be unsaturated, halogenated or carry a specific functionality such as hydroxyl, ether, amine, cyano, or nitro functions. The alkyl substituents $R^1$-$R^4$ may also form bicyclic structures, where an increased ring strain may lead to stronger basicity. Examples of cyclic amidines are 1,5-diazabicyclo[4.3.0]non-5-ene (DBN), 3,3,6,9,9-pentamethyl-2,10-diazabicyclo-[4.4.0]dec-1-ene, 1,8-diazabicyclo[5.4.0]undec-7-ene (DBU). DBU is considered to be the strongest amidine derivative.

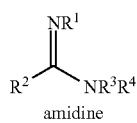
amidine

Amidine Structure.

Guanidines can similarly be classified as amines which posses two imine functions adjacent to the α-carbon (schema below). These correspond to amine equivalents of ortho esters and show the strongest Brønsted basicity among amine derivatives. The basicity of guanidine is close to that of a hydroxyl-ion, which is the strongest base in aqueous chemistry. The alkyl substituents $R^1$-$R^5$ may consist of hydrogen and/or C1-C16 alkyl substituents that may be linear, branched, cyclic or aromatic. Further these alkyl substituents $R^1$-$R^5$ may be unsaturated, halogenated or carry a specific functionality such as hydroxyl, ether, amine, cyano, or nitro functions. The alkyl substituents $R^1$-$R^5$ may also form bicyclic structures, where an increased ring strain may lead to stronger basicity. Examples of common guanidines are 1,5,7-triazabicyclo[4.4.0]dec-5-ene (TBD), N-methyl-1,5,7-triazabicyclo[4.4.0]dec-5-ene (MTBD), N,N,N',N'-tetramethylguanidine (TMG), or N,N,N',N',N"-pentamethylguanidine (PMG) can be given as examples of guanidine compounds.

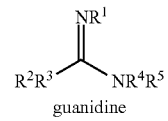
guanidine

Guanidine Structure.

Phosphazenes are organic super bases containing a phosphorus atom [P(V)] bonded to four nitrogen functions of three amine substituents and one imine substituent. Phosphazenes are classified as $P_n$ bases, where n denotes the number of phosphorus atoms in the molecule. The basicity of phosphazenes increase with an increasing amount of phosphorous atoms in the molecule. A $P_4$ base is considered to have a basicity parallel to organo lithium compounds. The alkyl substituents R and $R^1$ consist of hydrogen and/or C1-C16 alkyl substituents that may be linear, branched, cyclic or aromatic. Further these alkyl substituents R and $R^1$ may be unsaturated, halogenated or carry a specific functionality such as hydroxyl, ether, amine, cyano, or nitro functions. The alkyl substituents R may be the same or mixtures of various combinations. Common phosphazenes are 1-tert-butyl-2,2,4,4,4-pentakis(dimethylamino)-$2\lambda^5,4\lambda^5$-catenadi(phosphazene) ($P_2$-t-Bu) and 1-tert-butyl-4,4,4-tris(dimethylamino)2,2-bis[tris(dimethylamino)-phosphoranylidenamino]-$2\lambda^5,4\lambda^5$-catenadi(phosphazene) ($P_4$-t-Bu) to give examples.

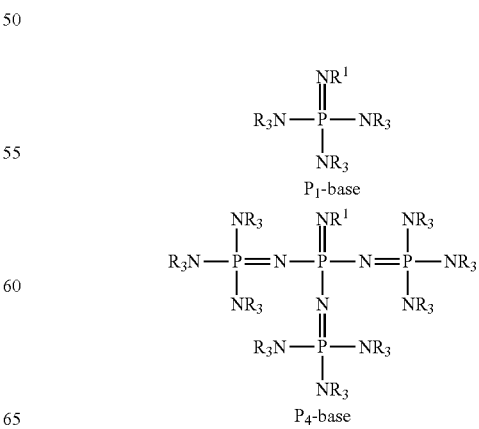

$P_1$ and $P_4$ Phosphazene Structures.

In a preferred embodiment the ring opening polymerization is performed in the presence of an initiator such as alcohols, polyols, hydroxyacids, thiols, polythiols, water or mixtures thereof. Specific examples of alcohol initiators are 1-butanol and 1-pyrenebutanol (Py). The use of multifunctional compounds as an initiators permit the formation of branched, brush-like or star-shaped polymers which may have unique properties when compared to their linear analogs. Similarly, macromolecules such as monosaccharides, disaccharides, oligomeric and polymeric saccharides as well as hydroxyl- or thiol functional polymers can be used as macroinitiators for the ring opening polymerization.

In one embodiment a dispersion stabilizer (also called as polymer stabilizer or dispersant) is used in the method of the present invention. The dispersion stabilizer when properly chosen has the ability to control the size of the particles produced in the in situ process. The average particle size of the product resulting from the in situ process reduces when a dispersion stabilizer is used.

Other factors too have an impact to the particle size including the solvent used (as discussed above) and monomer concentration in the reaction mixture. The monomer concentration in the reaction mixture in a batch like process depends on the ability of the solvent to dissolve the monomer. The monomer concentration in the reaction mixture may be up to 50%. In one embodiment of the present invention the monomer concentration in the reaction mixture is from 5 to 50%, preferably from 15 to 50%, more preferably from 20 to 50%.

The dispersion stabilizers are selected from non-ionic, ionic or zwitterionic molecules and from polymeric dispersion stabilizers, preferably the dispersion stabilizer is a polymeric dispersion stabilizer. The dispersion stabilizer may contain a hydrophilic moiety or a hydrophobic moiety or both. In all cases the size of the molecule or length of the polymeric segments involved in the said dispersion stabilizer, or the molecular weight of the dispersion stabilizer, have an effect on the resultant particle size and morphology.

In the method of the present invention the amount of the dispersion stabilizer is from 0.01 to 30 wt-%, preferably from 0.1 to 10 wt-%, and more preferably from 0.1 to 5 wt-% based on the weight of the glycolide monomer.

Examples of ionic dispersion stabilizers are molecules containing at least one hydrophobic $C_4$- to $C_{40}$-aliphatic radical and a hydrophilic group. The aliphatic radical may also contain hydrophobic organofluorine radicals. The aliphatic radicals may also contain heteroatoms, e.g. ether, keto or hydroxy groups, aromaticity, as well as multiple carbon-carbon bonds. Specific examples of such are 2-ethylhexyl, decyl, dodecyl, oleyl and octadecyl groups. Examples of hydrophilic groups are amines, amine oxides and ammonium salts, as well as polyalcohols or amino alcohols.

Examples of zwitter ionic dispersion stabilizers are aliphatic derivatives of amino acids and aminosulphates such as N-alkylaminopropanoic acid, N-alkyl-β-iminodipropanoic acid, imidazolinecarboxylic acid, N-alkylbetaines, N-alkylsulphobetaines.

The polymeric dispersion stabilizer is selected from the group comprising polyethylene oxide derivatives of alkyl phenols, aliphatic alcohols, aliphatic carboxylic acids, polyethylene oxide derivatives of fatty acid esters with polyalcohols, fatty acid derivatives of alcohol amines, polyether-polysiloxane copolymers, polyacrylates, polyethylene-vinyl alcohol copolymers and polyvinylpyrrolidone. Preferably the polymeric dispersion stabilizer is glycerol, sorbitol, diethanolamine or polyvinylpyrrolidone. More preferably the polymeric dispersion stabilizer is polyvinylpyrrolidone The polymeric dispersion stabilizers may have different average molecular weights. For example a polyvinylpyrrolidone, PVP10, has average molecular weight 10000 g/mol, and another polyvinylpyrrolidone, PVP55, has average molecular weight 55000 g/mol.

It was found that a higher molecular weight dispersion stabilizer yields a smaller average particle size in situ product, and by using a dispersion stabilizer having a lower molecular weight results to larger average particle size in situ product.

Suitable dispersion stabilizers are also commercially available. Examples of such are obtainable under trade names MYRJ™ by Croda; TRITON™ and TERGITOL™ by Dow Chemical Company; ACLYN™ by Herbits Chemical; TEGO™ by Evonik; BYK™ by BYK Chemie; and Novec™ by 3M. There are several other dispersion stabilizers by various suppliers which may similarly be used by those who are accustomed to the state-of-the-art.

The ring opening polymerisation according to the present invention may be performed using typical slurry-polymerization reactors equipped with adequate stirring and cooling capacity. In one embodiment of the present invention glycolide, optional co-monomer, optional initiator and dispersion stabilizer are dissolved in a solvent. Catalyst is added to the solution to initiate the polymerization which is allowed to proceed at selected temperature.

Polymerization reactors can be operated in batch, semi-batch or continuous mode. The polymerisation reaction is relatively fast and heat of the reaction has to be controlled and removed by suitable means. Preferably the ring opening polymerisation is performed in semi-batch and continuous processes.

In batch process the monomer(s), the solvent and the dispersion stabiliser are typically charged before addition of the catalyst. Typically a temperature increase peak is observed inside the reactor when the catalyst is added, and thus batch process is suitable only for relatively small reactor volumes.

The heat of the reaction is easier to control and remove when polymerisation is performed in semi-batch process e.g. through controlled feed of the monomer and/or the catalyst to the solvent containing dispersion stabiliser, while the reaction heat is removed through e.g. cooling jacket of the reactor. The monomer feed can be continued until the maximum slurry concentration, allowed by the stirring capability, is reached. After the reaction the solid polymer is separated from the liquids and eventually dried.

In an embodiment of the invention the ring opening polymerization is performed using a continuous polymerization process. The continuous polymerization enables high conversion rates and cost effective production processes from glycolide monomer and optional cyclic ester co-monomer to the corresponding glycolide homopolymer or copolymer. In a continuous process the monomer(s), the solvent, the dispersion stabilizer and the catalyst are fed continuously to the reactor equipped with adequate stirring and cooling capacity. Simultaneously the reactor content is continuously or intermittently removed from the reactor. The solid content of the continuous reactor can be held as high as the reactor stirring capability allows. In this way the polymerization rate and the heat of the reaction is being most effectively controlled and the polymerization process can be designed for large capacities. One preferred continuous polymerization reactor type is so called loop-reactor, which is largely utilized in production of polyethylene or polypropylene (for example so called Phillips process for high density polyethylene). Loop-reactors have typically effective stirring and high ratio of heat transfer area to reactor volume allowing high production rates. In an embodiment of the present invention formed polymer slurry is removed from the reactor and fed to a solid-liquid separation unit, e.g. filtration, separator, decanter centrifuge or hydrocyclones. The solvent is recycled to the polymerization reactor, and obtained solid polymer particles are dried to a powder form. The polymer powder can be separated from the process as such, or optionally the polymer powder can be blended with additives and further melted and pelletized with pelletizing extruders. The combined monomer and polymer concentration in the reaction mixture in a continuous process depends on the ability of the solvent to dissolve the monomer and the rate of removal of the polymer. The combined monomer and polymer concentration in the reaction mixture in a continuous process may be up to 70% while still permitting a process where the reaction mixture still exhibits a viscosity that is viable in the process. In one embodiment of the present invention the monomer concentration, in continuous process, in the reaction mixture is from 5 to 70%, preferably from 15 to 70%, more preferably from 20 to 70%.

The ring opening polymerization is performed at temperature of equal or less than 120° C., preferably equal or less than 60° C. In an embodiment of the present invention the ring opening polymerization is performed at room temperature. It is advantageous, to obtain high polymerization rates, to polymerize at temperatures 40-60° C., to allow high enough temperature difference between reactor content and cooling medium.

The ring opening polymerization may be performed at various pressures. The relatively low polymerization temperature allows operating at relatively low pressures, but overpressure can be applied if required by e.g. product transfer from one process unit to another. Polymerization is typically performed at pressure below 10 bar and one preferred operation mode is to polymerize at the atmospheric pressure. This makes possible to utilize process units with low pressure ratings and thus lower cost.

The reaction time in the ring opening polymerization according to one embodiment of the present invention is less than 5 hours, preferably from about 1 to about 2 hours. Said reaction times allow designing continuous polymerization process with reasonable residence times of the reactors thus enabling utilizing relatively low rector volumes.

In the method for preparing glycolide polyester by ring opening polymerization according to the present invention, the resulting glycolide homopolymer or copolymer, which precipitates from the solvent, is separated from the solvent. The separation of glycolide polyester from solvent is done by filtration, with separator, decanter centrifuge or hydrocyclones, or by evaporating the solvent. The separated glycolide polyester is recovered as a dried powder.

In one embodiment of the present invention, an in situ ring opening polymerizing process product is obtained with the method of the present invention. Said in situ ring opening polymerizing process product comprises a precipitated glycolide homopolymer or co-polymer in combination with the reacted catalyst, and said in situ process product has an average particle size equal or less than 200 μm, preferably equal or less than 50 μm, more preferably equal or less than 20 μm, and most preferably equal or less than 10 μm.

The present invention relates also to an in situ process product. The in situ ring opening polymerizing process product is obtained by subjecting glycolide monomer and optional cyclic ester co-monomer(s) to ring opening polymerization in the presence of a dispersion stabilizer and a catalyst, said catalyst being selected for precipitating glycolide homopolymer or co-polymer from solvent, said solvent being selected so that said glycolide monomer and optional co-monomer(s), said dispersion stabilizer and said catalyst are soluble therein but resulting glycolide homopolymer or co-polymer is non-soluble. The solvent is further chosen so that the difference in solubility parameters of said solvent and monomers are as small as possible which will permit high solid contents in the polymerization mixture. For instance, acetonitrile permits 50 wt-% solutions of glycolide and is particularly preferred. Said in situ product comprises a precipitated glycolide homopolymer or co-polymer in combination with the reacted catalyst. Said in situ process product has an average particle size equal or less than 200 μm, preferably equal or less than 50 μm, more preferably equal or less than 20 μm. Most preferably the average particle size is invention equal or less than 10 μm. This is beneficial for some polymer applications, for example as binder or in powder coating. The particle size is controlled by the dispersion stabilizer.

The amounts of the dispersion stabilizer(s), reagent(s) and solvent(s) may be adjusted to obtain needed or optimal particle size. Morphology and size of resultant polymer particles are also affected by choice of conditions. The SEM images show different morphologies of the polymer synthesized in different solvents by the method of the present invention. In FIG. 1 the image (a) represents polymerization in dichloromethane, images (b) and (c) represent polymerizations in DMF, images (d) to (g) represent polymerizations in acetonitrile. The polymers have irregular shapes if synthesized in $CH_2Cl_2$ (image (a)). In contrast, the polymers synthesized in DMF or ACN are spherical particles (images (b)-(g)).

The benefit, among others with the ring opening polymerization process according to the present invention lays in its suitability for use in common slurry-type reactors and the resultant polymer may be directly applied without further processing. A further benefit of the polymerization process is that the polymerization is completed rapidly at room temperature eliminating the need for heating. The conversions for the polymerizations are high minimizing costly purification steps which involve environmentally unfriendly solvents, such as hexafluoro isopropanol.

According to one embodiment of the present invention the in situ ring opening polymerizing process the product is in a flowing powder form after the solvent has been removed. The free flowing polymer powders are very beneficial since they have many practical advantages for industrial manufacturing. In practice it means that the emulsion does not coalesce or fuse into larger bodies. In this form the obtained powder, after solvent removal, is easily handled and can be conveniently used for the manufacturing of formed bodies by extrusion, injection molding or other common methods used to prepare defined articles from polymeric materials.

The glycolide homopolymer or co-polymer prepared by the method according to the present invention can be utilized in various applications. The glycolide homopolymer or co-polymer can be used for example in pharmaceutical applications, in packaging materials, in fibres, in coatings or in matrixes for controlled release of active substances.

The glycolide homopolymer or co-polymer prepared by the method according to the present invention may be processed further. A method for further processing the glycolide homopolymer or co-polymer prepared by the method of the present invention comprises:

melt blending the glycolide homopolymer or co-polymer powder with polymer additives or reinforcing agents, and pelletizing to granules suitable for thermoplastic polymer converting methods, such as extrusion or moulding.

The present invention is illustrated by the following examples, without in any way being limited thereto or thereby.

EXAMPLES

Procedures 1,5,7-Triazabicyclo[4.4.0]dec-5-ene (TBD, 98%) and polyvinylpyrrolidones (PVP10, 10000 g/mol, and PVP55, 55000 g/mol) were dried overnight under reduced pressure prior to use.

1,8-Diazabicyclo[5.4.0]undec-7-ene (DBU, 98%), tetramethylguanidine (TMG), anhydrous 1-Butanol (BuOH, 99.8%), 1-tert-Butyl-2,2,4,4,4-pentakis(dimethylamino)-$2\lambda^5,4\lambda^5$-catenadi(phosphazene) ($P_4$-t-Bu, ~1M in hexane), 1-tert-Butyl-4,4,4-tris(dimethylamino)-2,2-bis[tris(dimethylamino)phosphoranylidenamino]-$2\lambda^5,4\lambda^5$-catenadi(phosphazene) ($P_2$-t-Bu, ~2M in THF) and benzoic acid were used as received.

Solvents were dried using commonly known procedures.

Thermal analysis of polymers was performed using Mettler Toledo Differential Scanning calorimeter (DSC) model DSC820 system STAR$^e$ SW 9.20 (Switzerland). The measurements were done in nitrogen atmosphere flowing at 50 ml/min and with scan rate 10° C./min. Ca. 5-10 mg samples were weighed into standard 40 μl oxidized aluminium pans. Polymer samples were first cooled at −10° C. then heated to 230° C. and cooled at −10° C. and again reheated and cooled. All the data given (melt temperature, crystallization temperature, and glass transition temperature) are taken from the second cycle.

$^{13}C$ NMR was applied to estimate the molar mass of polymers. The NMR measurements were performed with a Bruker Avance III 500 MHz NMR spectrometer using a 5.0 mm (o.d.) BB probehead. Samples were prepared in deuterated HFIP (hexafluoroisopropanol) at concentration of ~50 mg/ml. Relaxation agent ($Cr(acac)_3$) in 50 mM concentration and inverse gated decoupling sequence was operated for achieving quantitative conditions. Following parameters were used: 90 degree pulse=9.3 us, number of scans=20 000 and pulse delay=3 s. The chemical shifts were referenced to TMS (0 ppm).

Molecular weights were determined with a Waters GPC system using HFP as an eluent.

The ring opening polymerization according to the present invention was performed at room temperature in organic solvents by use of metal-free organocatalysts and initiators. The reactions went so fast at room temperature (even at ° 0 C.) that a cloudy emulsion forms obviously and immediately just after injection of the catalyst solution into the reactant mixture. The heat released from polymerization, according to the test batches, caused a steep rise of the reaction temperature up to 28-29° C. from room temperature (23° C.) in a few minutes and dropped down in a few minutes later. Interestingly, the emulsion showed different colour according to the solvent used. In DMF the emulsion presented a pink colour after the reaction started. However, the emulsion was always white in $CH_2Cl_2$. If using ACN as a solvent, the emulsion became yellowish with the reaction time. But all the colours could be removed from the polymer products after washing the products a few times with a solvent. The final product may look like yellowish a bit. Overall, the reaction is very easy to handle with no need of heating, vacuum or protection gas. And the purification procedure is simple too by filtration and washing.

Example 1

Solubility Tests

A solvent which could be used in the ring opening polymerization should meet criteria: i) the solvent should be good enough to dissolve all starting materials including monomer (glycolide), co-monomer, initiator, catalyst and dispersion stabilizer, and ii) it should not dissolve resulting polymer (homopolyglycolide and co-polymers). Table 1 discloses the results of the solubility tests. Overall, ACN was the most suitable solvent, and toluene the least suitable.

TABLE 1

Test of solubility of the starting materials and homopolyglycolide in organic solvents.

| Compound | $CH_2Cl_2$ | Toluene | THF | DMSO | DMF | ACN |
|---|---|---|---|---|---|---|
| Glycolide | C | bad | C | B | B | A |
| Py (Initiator) | B | — | B | B | B | A |
| PVP (stabilizer) | B | — | B | B | B | A |
| TBD (Catalyst) | C | — | C | B | B | A |
| Polyglycolide | C | — | C | C | C | C |

A = good;
B = acceptable;
C = poor solubility;
— = not tested

Example 2

Glycolide (0.25 g), acetonitrile (0.75 g) and 1-butanol (2 μl) were mixed in a round bottom flask equipped with a Teflon covered magnetic stir bar. Three similar experiments were done by addition of TBD (3 μg) and the reaction was allowed to proceed for 10 s, 20 s and 30 s at room temperature. The yields were 69%, 83%, and 97%. This emphasizes the speed of the polymerization at ambient conditions.

Example 3

Glycolide (0.5 g) was dissolved in acetonitrile (1.5 g) in a round bottom flask equipped with a Teflon covered magnetic stir bar. 1-butanol (4 μl) and DBU (32 μl) were added. The reaction was allowed to proceed for 120 min at room temperature. The yield was 98%.

Example 4

Glycolide (0.5 g) was dissolved in acetonitrile (1.5 g). 1-butanol (4 μl) and $P_2$-t-Bu (2M, 16 μl) were added. The reaction was allowed to proceed for 120 min at room temperature. The yield was 14%.

Example 5

Glycolide (0.5 g) was dissolved in acetonitrile (1.5 g). 1-butanol (4 μl) and $P_4$-t-Bu (1M, 27 μl) were added. The reaction was allowed to proceed for 120 min at room temperature. The yield was 14%.

Example 6

Glycolide (0.5 g) was dissolved in acetonitrile (1.5 g). 1-butanol (4 µl) and titanium isopropoxide (13 µl) were added. The reaction mixture was heated to 140° C. for 10 min and then cooled to room temperature, and the reaction was allowed to proceed for 4 h. The yield was 95%.

Example 7

Glycolide (0.5 g) was dissolved in acetonitrile (1.5 g). 1-butanol (4 µl) and tin (II) ethyl hexanoate (14 µl) were added. The reaction mixture was heated to 140° C. for 1 h and then cooled to room temperature was allowed to proceed for 2 h. The yield was 91%.

Example 8

Glycolide (0.5 g) was dissolved in acetonitrile (1.5 g). 1-butanol (4 µl) and TMG (27 µl) were added. The reaction was allowed to proceed for 129 min at room temperature. The yield was 98%.

Example 9

Glycolide (1.16 g) was dissolved in dichloromethane (25 ml). 1-butanol (1 mol-% of glycolide), PVP-10 (0.83 wt-% to glycolide) and TBD (0.5 mol-% of glycolide) were added. The reaction was allowed to proceed for 16 h at room temperature. The yield was 97% and the particle size was 17 µm.

Example 10

Glycolide (1.16 g) was dissolved in N,N-dimethylformamide (10 ml). 1-butanol (1 mol-% of glycolide), PVP-10 (0.83 wt-% to glycolide) and TBD (0.5 mol-% of glycolide) were added. The reaction was allowed to proceed for 16 h at room temperature. The yield was 98% and the particle size was 3.3 µm.

Example 11

Glycolide (3.5 g) was dissolved in N,N-dimethylformamide (10 ml). 1-butanol (1 mol-% of glycolide), PVP-10 (0.83 wt-% to glycolide) and TBD (0.5 mol-% of glycolide) were added. The reaction was allowed to proceed for 16 h at room temperature. The yield was 98% and the particle size was 3.6 µm. After sonication the particle size was ~1.5 µm.

Example 12

Glycolide (1.16 g) was dissolved in N,N-dimethylformamide (10 ml). 1-butanol (1 mol-% of glycolide), PVP55 (0.83 wt-% to glycolide) and TBD (0.5 mol-% of glycolide) were added. The reaction was allowed to proceed for 16 h at room temperature. The yield was 98% and the particle size was 6.2 µm. After sonication the particle size was ~4.2 µm.

Example 13

The reaction was performed at a larger scale within a 1 l glass reactor equipped with an overhead stirrer to provide improved mixing. Glycolide (300 g), 1-butanol (1.9 g), and PVP 55 (14.2 g) was dissolved in N,N-dimethylformamide (755 g). TBD (9.8 g) was added to initiate the polymerization which was allowed to proceed at room temperature for 2 h.

In Table 2 are disclosed results of the ring opening polymerizations of Examples 9 to 13.

TABLE 2

Results of the ring opening polymerizations.

| Entry | Cat. | Conv. (%) | Solvent | Solid cont. (%) | Size (µm) |
|---|---|---|---|---|---|
| Example 9 | TBD | 97 | $CH_2Cl_2$ | 3.5 | 17.4 ± 2.0 |
| Example 10 | TBD | 98 | DMF | 25 | 3.3 ± 0.6 |
| Example 11 | TBD | 98 | DMF | 37 | 3.6 ± 0.7 |
| Example 12 | TBD | 98 | DMF | 25 | 6.2 ± 0.9 |
| Example 13 | TBD | 98 | DMF | 25 | 1.9 ± 0.2 |

The invention claimed is:

1. A method for preparation a glycolide polyester by ring opening polymerization, comprising the steps of:
    a) subjecting a glycolide monomer with optional co-monomer(s) of cyclic ester(s) to ring opening polymerization in the presence of a dispersion stabilizer and a catalyst, wherein
    said catalyst is 1-tert-Butyl-2,2,4,4,4-pentakis(dimethylamino)-$2\lambda^5,4\lambda^5$-catenadi(phosphazene), or 1-tert-Butyl-4,4,4-tris(dimethylamino)-2,2-bis[tris(dimethylamino)-phosphoranylidenamino]-$2\lambda^5,4\lambda^5$-catenadi(phosphazene), and
    selected for precipitating glycolide homopolymer or co-polymer from a solvent, said solvent being selected so that said glycolide monomer and said optional co-monomer(s), said dispersion stabilizer and said catalyst are soluble therein but the resulting glycolide homopolymer or co-polymer is non-soluble, and
    b) precipitation of the glycolide homopolymer or copolymer starting immediately after adding the catalyst.
2. The method according to claim 1, wherein said solvent does not react with the glycolide monomer or optional cyclic ester co-monomer(s) in the polymerization conditions, and wherein the ring opening polymerization has a reaction time of less than five hours.
3. The method according to claim 1, wherein said co-monomer is selected from the group comprising lactides, lactones and mixtures thereof.
4. The method according to claim 1, wherein the catalyst is a super base catalyst.
5. The method according to claim 1, wherein the catalyst is metal-free super base catalyst.
6. The method according to claim 1, wherein the catalyst is selected from the group comprising amidine, guanidine and phosphazene derivatives.
7. The method according to claim 1, wherein the catalyst is 1,5-Diazabicyclo[4.3.0]non-5-ene, 3,3,6,9,9-pentamethyl-2,10-diazabicyclo-[4.4.0]dec-1-ene, or 1,8-diazabicyclo-[5.4.0]undec-7-ene.
8. The method according to claim 1, wherein the catalyst is 1,5,7-triazabicyclo[4.4.0]dec-5-ene, N-methyl-1,5,7-triazabicyclo[4.4.0]dec-5-ene, N,N,N',N'-tetramethylguanidine, or N,N,N',N',N''-pentamethylguanidine.
9. The method according to claim 1, wherein the catalyst is a cationic catalyst.
10. The method according to claim 1, wherein said ring opening polymerization is performed in the presence of an initiator.

11. The method according to claim 10, wherein the initiator is a macro-initiator.

12. The method according to claim 1, wherein the dispersion stabilizer is selected from the group comprising non-ionic, ionic, zwitterionic molecules and polymeric dispersion stabilizers.

13. The method according to claim 1, wherein said solvent is an organic solvent.

14. The method according to claim 13, wherein said organic solvent is selected from the group comprising acetone, acetonitrile, dimethyl sulfoxide, N,N-dimethylformamide, tetrahydrofuran, and mixtures thereof.

15. The method according to claim 13, wherein said organic solvent does not initiate or terminate said ring opening polymerization process defined in claim 1.

16. The method according to claim 1, wherein said ring opening polymerization is performed at the temperature of less than 120° C.

17. The method according to claim 1, wherein said ring opening polymerization is performed at pressure below 10 bar.

18. The method according to claim 1, wherein said glycolide polyester is separated from the solvent and recovered as a dried powder.

19. The method according to claim 18, wherein the separation of glycolide polyester from solvent is done by filtration, with separator, decanter centrifuge or hydrocyclones, or by evaporating the solvent.

20. The method according to claim 1, wherein said ring opening polymerization is performed at semi-batch or continuous polymerization process.

21. The method according to claim 1, wherein the method results an in situ ring opening polymerizing process product comprising a precipitated glycolide homopolymer or co-polymer in combination with the reacted catalyst, and said in situ process product has average particle size equal or less than 200 μm.

22. A method for using a glycolide homopolymer or copolymer for preparation a glycolide polyester by ring opening polymerization wherein glycolide monomer with optional co-monomer(s) of cyclic ester(s) is/are subjected to ring opening polymerization in the presence of a dispersion stabilizer and a catalyst, said catalyst being 1-tert-Butyl-2,2,4,4,4-pentakis(dimethylamino)-$2\lambda^5,4\lambda^5$-catenadi(phosphazene), or 1-tert-Butyl-4,4,4-tris(dimethylamino)-2,2-bis[tris(dimethylamino)-phosphoranylidenamino]-$2\lambda^5,4\lambda^5$-catenadi(phosphazene), and being selected for precipitating glycolide homopolymer or co-polymer from solvent, said solvent being selected so that said glycolide monomer and said optional co-monomer(s), said dispersion stabilizer and said catalyst are soluble therein but resulting glycolide homopolymer or co-polymer is non-soluble in pharmaceutical applications, in packaging materials, in fibres, in coatings or in matrix for controlled release of active substances.

23. A method for making processed glycolide homopolymer or copolymer preparations, said method comprising the steps of:
   a) preparing a glycolide polyester by ring opening polymerization according to method of claim 1;
   b) further processing said glycolide homopolymer or copolymer of step a) wherein said further processing comprises:
      i) melt blending said glycolide homopolymer or copolymer powder with polymer additives or reinforcing agents, and
      ii) pelletizing product of step i) to granules suitable for thermoplastic polymer converting methods.

24. The method according to claim 3, wherein said co-monomer is lactide, ε-caprolactone, pivalolactone, β-propiolactone, γ-butyrolactone, δ-valerolactone, γ-valerolactone or mixtures thereof.

25. The method according to claim 10, wherein the initiator is alcohol, polyol, hydroxyl acid, thiol, polythiol, water or mixtures thereof.

26. The method according to claim 11, wherein the initiator is polymeric or oligomeric saccharide.

27. The method according to claim 12, wherein the dispersion stabilizer is polymeric dispersion stabilizer.

28. The method according to claim 13, wherein said solvent is ether, ketone or amine.

29. The method according to claim 16, wherein said ring opening polymerization is performed at the temperature of less than 60° C.

30. The method according to claim 17, wherein said ring opening polymerization is performed at the atmospheric pressure.

31. The method according to claim 1, wherein said ring opening polymerization is performed at continuous process utilizing a loop-reactor.

32. The method according to claim 21, the in situ process product has average particle size equal or less than 50 μm.

33. The method according to claim 32, said in situ process product has average particle size equal or less than 20 μm.

34. The method according to claim 33, wherein said in situ process product has average particle size equal or less than 10 μm.

* * * * *